Feb. 2, 1926.  1,571,337
C. KNOWLES
GEAR GRINDER
Filed Nov. 2, 1923  2 Sheets-Sheet 2

INVENTOR
Carroll Knowles
BY
Joseph K. Schofield
ATTORNEY

Patented Feb. 2, 1926.

1,571,337

UNITED STATES PATENT OFFICE.

CARROLL KNOWLES, OF HARTFORD, CONNECTICUT, ASSIGNOR TO PRATT & WHITNEY COMPANY, OF NEW YORK, N. Y., A CORPORATION OF NEW JERSEY.

GEAR GRINDER.

Application filed November 2, 1923. Serial No. 672,391.

*To all whom it may concern:*

Be it known that I, CARROLL KNOWLES, a citizen of the United States, residing at Hartford, in the county of Hartford and State of Connecticut, have invented certain new and useful Improvements in Gear Grinders, of which the following is a specification.

This invention relates to gear grinding machines adapted to grind involute tooth curves of gears upon a generating system.

In particular, the present invention relates to improvements in gear tooth grinding machines of the type shown and described in the copending application of Tanner and Knowles Serial No. 621,307 filed February 26, 1923, of which this application is a continuation in part.

An object of the present invention is to improve the driving means for the spindle carrying the gear blank.

Another object of the invention is to provide an improved means for guiding the movements of the work spindle and attached parts about in their orbital path.

In the above mentioned copending application, the work spindle is rotated by means of a shaft attached directly thereto and in alignment therewith. In the present instance, the driving means comprises a train of gears attached to and moving with the outer one of the freely swinging arms supporting the work spindle. The outermost gear of this train is attached directly to the work spindle and the gear at the opposite end of the train is in driving connection with a shaft. By reason of the driving connections for the work spindle being removed from directly below the spindle, I am enabled to provide additional and improved guiding means for the spindle to aid in keeping the spindle carrying the work accurately within its proper path. Also in these driving means I interpose a pin and slot driving connection so that any shocks or vibrations in the driving shaft will not be transmitted to the driving gear and so to the work spindle. The driving shaft is preferably located in alignment with the flexible joint between the two swinging arms.

The copending application above referred to is provided with internal paths for guiding the work spindle, one of which paths is provided with gear teeth so that the gear blank may be simultaneously rolled while being traversed about in its orbit. A master gear having the same diameter of base circle and preferably having the same number of teeth as the gear being formed is provided on the work spindle with which the toothed path or periphery is adapted to engage. Adjacent the member having the internal toothed periphery is another member having an opening which is of the same general form as the toothed opening but with plain or smooth walls. This is adapted to be engaged by a roller bearing mounted on the work spindle adjacent the master gear. Similar members are utilized in the present construction.

In addition to the above guiding means for the work spindle, I provide, in the present instance, a member having an external surface of appropriate shape to aid in guiding the movements of the work spindle and attached parts. This member is adapted to be engaged by an extension formed on the lower end of the work spindle. This latter means holds the work spindle to its outermost position permitted by the two above mentioned internal paths. Preferably, this member engaging the work spindle upon its external surface is mounted upon an oscillating lever or other member adapted to be oscillated as the work spindle traverses its orbital path. Also, preferably, resilient means are used to maintain the lever in its operative oscillated positions.

With these and other objects in view, my invention consists in the features of construction and operation set forth in the following specification and illustrated in the accompanying drawings.

In the accompanying drawings annexed hereto and forming a part of this specification, I have shown my invention embodied in a single purpose spur gear grinding machine but it will be understood that the invention can be otherwise embodied and that the drawings are not to be construed as defining or limiting the scope of the invention, the claims appended to this specification being relied upon for that purpose.

Figure 1:
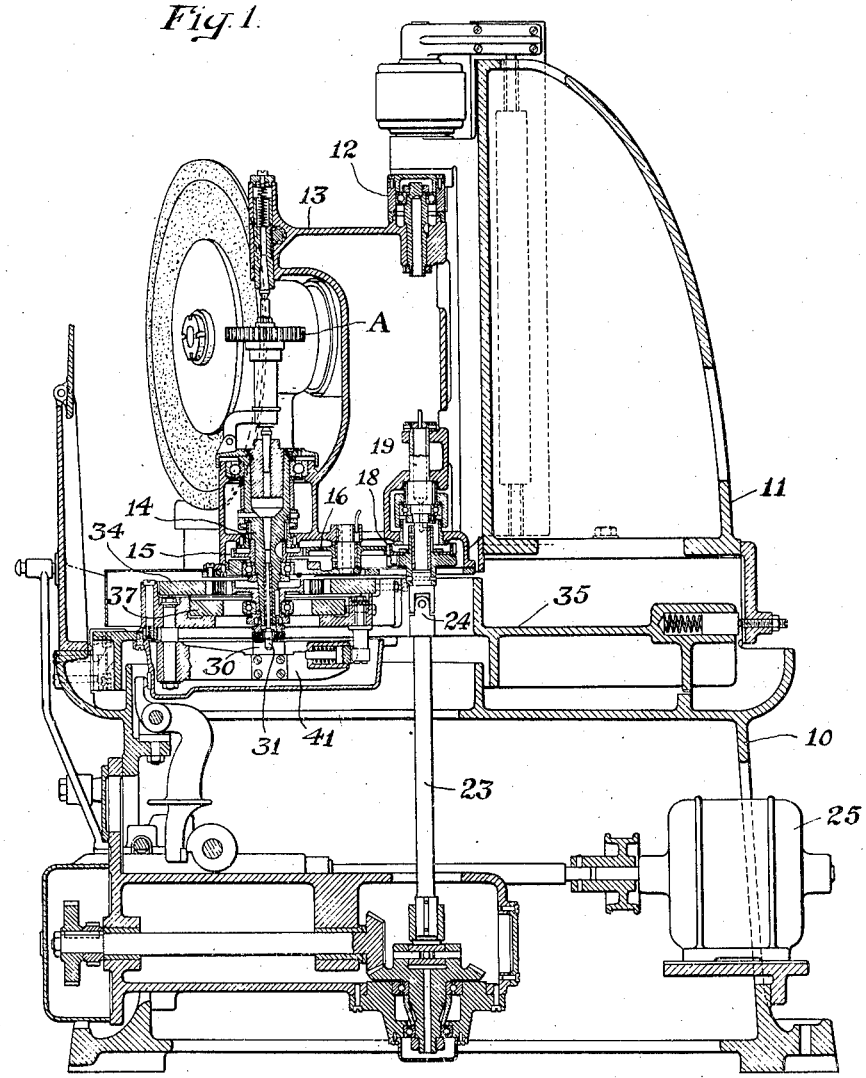
Figure 1 is a transverse vertical section of the complete machine provided with the present invention.

In the above mentioned drawings, I have shown but one embodiment of the invention which is now deemed preferable but it is to be understood that changes and modifications may be made within the scope of the appended claims without departing from the spirit of the invention.

Briefly, my invention in its broadest aspect comprises the following principal parts, these parts being in addition to those shown and described in the drawings of the above mentioned copending application: first, driving means for the work spindle comprising a plurality of gears mounted upon the outer one of the freely swinging arms, one of these gears being mounted upon and rotating with the work spindle; second, driving means attached to the gear at the opposite end of the train which is aligned with the hinge between the swinging arms; third, an oscillatory lever mounted just below the work spindle and carrying a member adapted to be engaged upon its outer periphery by a member on the lower end of the work spindle.

Referring more in particular to the figures of the drawing, a base 10 is provided having a column 11 mounted on its rear portion. On the forward vertical surface of this column 11 are adapted to be mounted the freely swinging arms or frames 12 and 13 similar in every way to those in the copending application above referred to. At the outer end of these arms 12 and 13 is rotatably mounted the work spindle 14. On the work spindle 14 extension means are provided whereby the gear blank A being operated upon may be secured thereto.

Preferably, and as shown in the figures of the drawings, the work spindle 14 is provided with a driving gear 15 directly secured thereto and adapted to rotate it, this gear 15 being in mesh with an intermediate gear 16 mounted rotatably on a stud 17 provided in the outer swinging arm 13. In mesh with this intermediate gear 16 is a driving gear 18 mounted upon a depending extension of the pivot connection 19 between the two swinging arms 12 and 13. This gear 18 is provided with a driving pin 20 engaging within a slot 21 provided in a driving member 22, this latter member 22 being attached to a rotatable shaft 23 preferably by means of a universal joint 24.

By means of the mechanism above described, it will be seen that rotating means have been provided for the work spindle 14, these driving means acting continuously in all positions of the spindle while moving about within its orbital path. Also, by means of the pin 20 and slot 21 connection between the gear 18 and its driver 22, any shocks in the rotative movement of the driving member 22 are not imparted to the gear 15 and work spindle 14. The gear blank A, therefore, on the work spindle 14 will be uniformly rotated without sudden shocks or vibrations. Any suitable means may be employed for rotating the driving shaft 23, preferably the same means being used as shown in the above mentioned application, this means comprising a motor 25 preferably housed within the base 10 and connected to the driving shaft 23 by means permitting the substitution of other gears for the gears 26 shown so that the rotative movement of the work blank A and its spindle 14 may be very widely varied.

By placing the rotating means for the work spindle 14 away from the space directly below it, I am enabled to provide an improved form of guiding means for the work spindle. These guiding means for the spindle 14 comprise members corresponding to those described in the copending application and also additional guiding means comprising a member 30. The outside surface of this member 30 contacts with a member 31 extending axially from the work spindle. This member 31 tends to hold the spindle 14 always to the outer limit of its orbital path.

Figure 2:
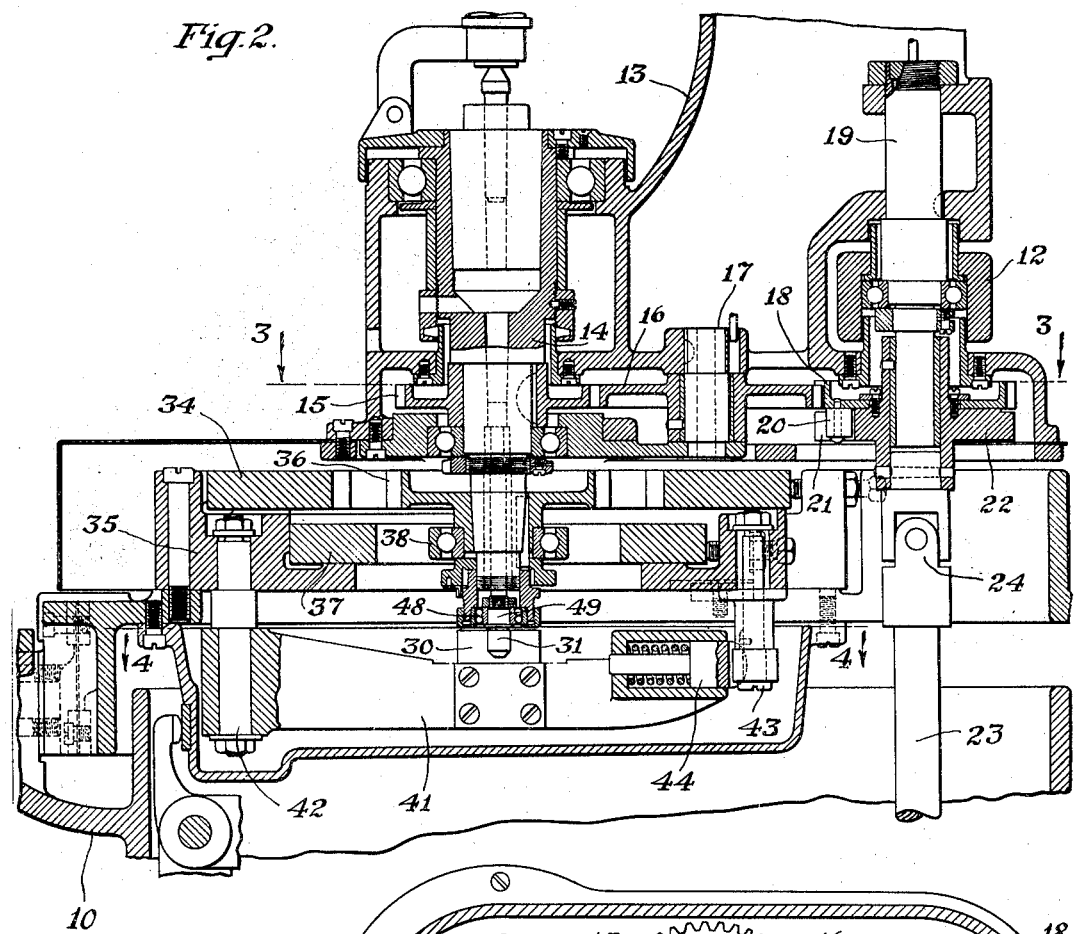
Fig. 2 is a similar view of portions of the improved mechanism shown upon an enlarged scale.
Figure 3:
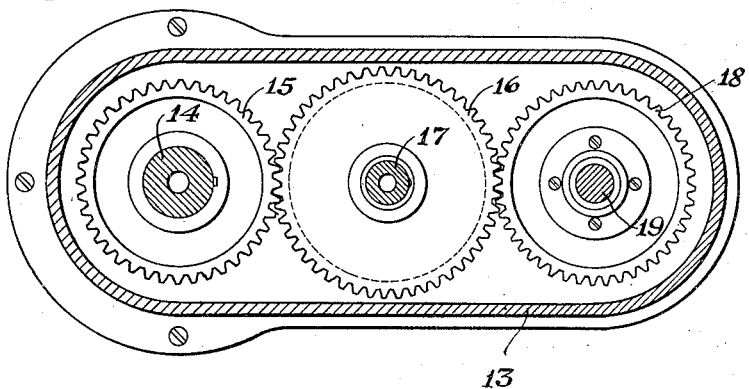
Fig. 3 is a plan view of a portion of the machine taken upon line 3—3 of Fig. 2.
Figure 4:
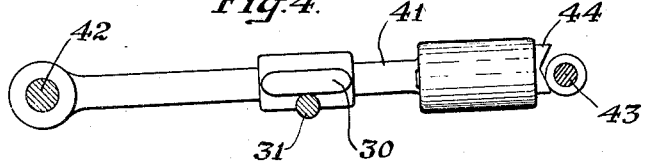
Fig. 4 is a plan view partially in section of a detail of the invention taken upon line 4—4 of Fig. 2.

As shown in Figs. 1 and 2, the member provided with the internal tooth path 34 which is mounted on the movable frame 35 is engaged by a master gear 36 on the work spindle 14. Below this member 34 which is provided with the toothed periphery is a member 37 having an opening corresponding generally in form to a toothed path in member 34 but having smooth surfaced walls. The walls of this opening in this member 37 are adapted to be engaged by the outer periphery of a roller bearing 38 on the work spindle 14. These two guiding means 34 and 37 are or may be entirely similar to and act in precisely the same way as those disclosed in the copending application referred to above. The additional guiding means 30 and 31 forming a part of the present invention and which provide for maintaining the work spindle 14 always in the outermost position of its orbit are mounted on an oscillatory lever 41. The lever is carried by and moves with the frame 35 on which are mounted the members 30 and 31 above described for guiding the work spindle 14. A stud 42 in the forward portion of this frame 35 forms a pivot for this member 41 and a stud 43 in the mid portion of the frame 35 provides means engaged by a spring detent 44 carried at the free end of this lever 41 to normally urge the lever 41 to its mid position. By reason of the spring detent 44 shown most clearly in Fig. 2, the lever 41 is resiliently held toward its central oscillated position by the pressure of the member 31 against the formed member 30.

Preferably mounted within the lower end of the work spindle 14 is a small ball bearing 48. On the inner race of this bearing 48 is attached a stud 49 having a depending portion which forms the member 31 above mentioned adapted to engage the outside surface of the member 30 carried by the oscillating lever 41.

By reason of this outside guiding member 30 being provided and as the work spindle 14 is rotated and rolled about in its orbital path, the stud 31 on the end of the work spindle 14 passes about the outside surface of this member 30. As the work spindle 14 passes around the end portions of its orbit, the stud 31 rounds the end of the outside surface 30 and tends to force the lever 41 toward the opposite side of the stud, the spring detent being moved sufficiently for this purpose. By this latter means so long as the work spindle 14 is upon the opposite mid portions of its orbit, the stud 31 on the work spindle engages the opposite sides of this outside engaging member 30. Also, as the spring detent 44 always tends to bring the lever 41 back to a central position, the work spindle 14 is constantly urged to the outermost positions permitted by the guiding means 34 and 37. As it is while the work spindle 14 is being rolled past these portions of its orbit that the blank A engages the grinding wheels (but one of which is shown in the drawings), the pressure to hold the blank against the wheels is always operating at the correct time.

It will be seen therefore that the wheel mountings and means for supporting the gear blank A are identical with the means disclosed in the copending application. Also the feeding mechanism for the blank relative to the wheels comprising the movable frame 35 is or may be entirely similar to that described in the copending application. As shown, this is accomplished by reason of the frame being movable forward and rearward a slight distance by a suitable cam 50. The guiding means, however, are novel and contain supplemental means over those described in applicant's copending application. The drive also is modified to permit the re-designed guiding means and in order to drive the work spindle through a pin and slot connection or an equivalent mechanism to eliminate shocks and vibrations in the rotative motion of the driving shaft.

What I claim is:

1. A machine for generating the tooth curves of gears comprising in combination, a base, a cutting wheel rotatably mounted thereon, a work spindle supported on said base so that it may move in any direction while its axis is maintained in parallel positions, means to rotate the work spindle comprising a gear on said spindle and driving gears in mesh therewith, and means to move the spindle about in a closed path.

2. A machine for generating tooth curves of gears comprising in combination, a base, a cutting wheel rotatably mounted thereon, freely swinging arms supported on said base, a work spindle supported on the free ends of said arms whereby it may move in any direction while its axis is maintained in parallel positions, means to rotate the work spindle comprising a gear on said spindle, driving means therefor mounted on one of said swinging arms, and means to move the spindle about in a closed path.

3. A machine for generating tooth curves of gears comprising in combination, a base, a cutting wheel rotatably mounted thereon, freely swinging arms supported on said base and pivotally connected together, a work spindle supported on the free end of said arms whereby it may move in any direction while its axis is maintained in parallel positions, means to rotate the work spindle comprising a gear on said spindle, a driving shaft in alignment with the pivotal connection between said arms, means connecting said driving shaft and the gear on said spindle, and means to move the spindle about in a closed path.

4. A machine for generating tooth curves of gears comprising in combination, a base, a cutting wheel rotatably mounted thereon, freely swinging arms supported on said base and pivotally connected together, a work spindle supported on the free end of said arms whereby it may move in any direction while its axis is maintained in parallel positions, means to rotate the work spindle comprising a gear on said spindle, a driving shaft in alignment with the pivotal connection between said arms, gears connecting said driving shaft and the gear on said spindle, and means to move the spindle about in a closed path.

5. A machine for generating the tooth curves of gears comprising in combination, a base, a cutting wheel rotatably mounted thereon, a work spindle supported on said base so that it may move in any direction while its axis is maintained in parallel positions, means to rotate the work spindle comprising a gear on said spindle, gears in mesh therewith, a driving shaft for said gears and spindle, and a pin and slot connection between the driving shaft and one of the gears.

6. A machine for generating tooth curves of gears comprising in combination, a base, a cutting wheel rotatably mounted thereon, freely swinging arms supported on said base, a work spindle supported on the free ends of said arms whereby it may move in any direction while its axis is maintained in parallel positions, means to rotate the work spindle comprising a gear on said spindle, and a driving shaft therefor mounted at one of the pivotal connections of said swinging arms, means connecting said shaft and the gear on said spindle, and means to move the spindle about in a closed path.

7. A machine for generating the tooth curves of gears comprising in combination, a base, a cutting wheel rotatably mounted thereon, a work spindle supported on said base so that it may move in any direction while its axis is maintained in parallel positions, means to rotate said spindle, and means to guide the movement of said spindle in an orbital path comprising a member having an internal toothed outline, and a member adapted to engage a projection of said spindle upon its outside surface.

8. A machine for generating the tooth curves of gears comprising in combination, a base, a cutting wheel rotatably mounted thereon, a work spindle supported on said base so that it may move in any direction while its axis is maintained in parallel positions, means to rotate said spindle, and means to guide the movement of said spindle in an orbital path comprising a member having an internal toothed outline, a pivotal lever resiliently positioned, and a member mounted thereon adapted to engage a projection on said spindle upon its external curved surface.

9. A machine for generating the tooth curves of gears comprising in combination, a base, a cutting wheel rotatably mounted thereon, a work spindle supported on said base so that it may move in any direction while its axis is maintained in parallel positions, means to rotate said spindle, and means to guide the movement of said spindle in an orbital path comprising a member having an internal toothed outline, a gear on the spindle in engagement therewith, a pivotal lever resiliently forced toward its mid position, and a member carried thereby having an outside curved surface adapted to engage a projection formed on said spindle.

In testimony whereof, I hereto affix my signature.

CARROLL KNOWLES.